(12) United States Patent
Marocco

(10) Patent No.: US 7,467,578 B2
(45) Date of Patent: Dec. 23, 2008

(54) PISTON BLIND CUTTER

(75) Inventor: Norbert Marocco, Woodbridge (CA)

(73) Assignee: Shade-O-Matic Ltd, Toronto (CA)

( * ) Notice: Subject to any disclaimer, the term of this patent is extended or adjusted under 35 U.S.C. 154(b) by 0 days.

(21) Appl. No.: 11/016,918

(22) Filed: Dec. 21, 2004

(65) Prior Publication Data
US 2006/0130625 A1 Jun. 22, 2006

(51) Int. Cl.
B23D 23/00 (2006.01)
B26D 1/00 (2006.01)
B26D 5/08 (2006.01)

(52) U.S. Cl. .............................. 83/52; 83/197; 83/618; 83/627; 29/24.5

(58) Field of Classification Search ........... 83/196–200, 83/525, 530, 618, 620, 644, 52, 627, 630, 83/631, 632; 29/24.5
See application file for complete search history.

(56) References Cited

U.S. PATENT DOCUMENTS

| 2,428,650 | A | * | 10/1947 | Brunner | 83/199 |
| 5,170,689 | A | * | 12/1992 | Dvorak | 83/197 |
| 6,089,134 | A |   | 7/2000 | Marocco | |
| 6,196,099 | B1 |   | 3/2001 | Marocco | |
| 6,336,388 | B1 |   | 1/2002 | Marocco | |
| 6,553,878 | B2 | * | 4/2003 | Gosis et al. | 83/13 |
| 7,114,421 | B2 | * | 10/2006 | Marocco | 83/13 |
| 2003/0070515 | A1 | * | 4/2003 | Huang et al. | 83/13 |

* cited by examiner

Primary Examiner—Stephen Choi
(74) Attorney, Agent, or Firm—Miller Thomson LLP

(57) ABSTRACT

An apparatus for cutting elements of a window covering, such elements including at least a head rail, the apparatus comprising a holding plate having an opening for holding the head rail in a selected position; a cutting die disposed adjacent to the holding plate and having an opening for receiving the head rail extending therethrough; and a driving means operable to pivot the cutting die relative to the holding plate so as to cut the head rail.

6 Claims, 14 Drawing Sheets

PISTON BLIND CUTTER

FIELD OF INVENTION

The present invention relates generally to the art of sizing window coverings, including such window coverings as roller shades, mini blinds, pleated shades and vertical blinds. More particularly, the present invention relates to a system for sizing a variety of window coverings. This invention also generally relates to blind cutting systems combined with a drive such as pneumatic device.

BACKGROUND OF INVENTION

Numerous types of window coverings are now being sold in a variety of outlets. Window coverings of the type with which the present invention is concerned include, mini blinds and vertical blinds, as opposed to draperies and curtains which may be sold in the same outlets but which involve different sizing requirements.

Blinds and window coverings are available in a variety of materials. Venetian blinds are available in which the head and bottom rails are formed of aluminum steel, and in which the slats are formed in most cases of sheet steel or aluminum. In other cases the components can be formed of other materials such as thermoplastics.

Also, blinds are available that are formed of fabric, and are folded into pleats, the fabric being secured usually at the top to a head rail typically made of steel. Bottom rails are formed on some blinds of steel and on other blinds of other materials.

Such blinds must be fitted to the width, or in some cases the height, of the window or other opening for which they are intended. In the past blinds have been made in a factory, on a custom basis to a particular width specified by the purchaser. A salesperson would usually have had to call on the customer and take an order. However, it is more convenient to manufacture blinds and other window coverings in certain standard widths, and stock these standard widths in a retail store. A customer may then simply come into the store and buy a blind slightly wider than the desired width (or longer than the height) and have it trimmed at the ends to the desired width (or height). This is both more economical, and thus more readily saleable, and at the same time provides the customer with an opportunity to purchase blinds in a retail establishment and walk out of the store with them in his possession, rather than meeting a salesperson at home, and waiting a few weeks for them to be fabricated in a factory.

In the past, various apparati have been designed for cutting down widths of blinds of specific designs and specific materials. However, in general terms, these machines have not been completely suitable for cutting down blinds of a variety of different materials.

In addition to these factors, blinds and window coverings are also available in which blind slats are suspended vertically from a head rail. These blind slats may be drawn to one side or the other of the window opening, or in some cases to both sides, and may be rotated between open and closed positions, by a mechanism located in the head rail. Again, these blinds usually required a sales call, at the home, followed by custom fabrication in a factory.

Advantageously, these blinds are now provided in standard widths in a retail store and an apparatus is known for cutting down the width of the head rail and also the lengths of the vertical slats in the store. One such apparatus is described below. Preferably, in order to economize in-store installations of cut-down equipment and also to simplify instruction of staff, a single cut-down machine is used, which enables a greater variety of different types of blinds to be cut down to the desired width (or height).

One of the considerations in designing such a multi-purpose cut-down machine is the manual effort that is required to operate the machine to cut through the various different materials.

Clearly, material used in head rails, is relatively hard to cut. On the other hand, since the head rail sections used in this type of product are relatively thin, the die for cutting the metal or plastic components of the blind may only be required to move a short distance.

Consequently, so long as adequate leverage is provided to move the steel cutting die a relatively short distance, this problem can be addressed.

On the other hand, the cutting of the blind slats themselves presents entirely different problems. The slats are usually made of relatively soft material which is easy to cut, and requires less manual effort. On the other hand, the thickness of all of the blind slats when bundled together for cutting is considerable. Consequently, the die for cutting the blind slats must move a considerable distance.

The complexity of the design is further aggravated by the fact that the head rail is located at the head of the blind and the bottom rail is located at the bottom rail of the blind, both usually made of steel, and the blind slats or blind fabric are located between the head rail and the bottom rail. Consequently, when trimming the blind it is necessary to provide cutting dies for cutting both the head rail and the bottom rail, which are spaced apart from one another, and for substantially simultaneously cutting the blind slats or blind fabric (referred to herein as closure "closure elements") located between the head rail and bottom rail. It will of course be appreciated that in the case of horizontal, i.e. Venetian blinds or fabric blinds, all of these cuts must be made in a common plane, so as to provide a uniform end trimming function on the blind. Even for vertical blinds, the vertical blind slats must be trimmed, along their lower ends, by cutting all the slat ends along a common plane.

U.S. Pat. No. 6,089,134 ('134) issued to Shade-O-Matic Limited discloses a manually operable multi-purpose blind cutdown apparatus for cutting a blind having at least a head rail component, and closure elements suspended from the head rail, and comprising a blind holding plate having at least a blind component opening and a closure element opening formed therein for receiving respective components and elements of a blind there through, and holding them into position for cutting, a closure element cutting bar moveable relative to said holding plate (and defining an opening), and carrying closure element cutting means for cutting blind closure elements extending through said holding plate, a cutting die plate adjacent to said cutting bar, said cutting die plate carrying at least one cutting die for receiving said blind at least one component there through, and being moveable relative to said holding plate for cutting at least one said component, and wherein said cutting die on said cutting die plate extends through said opening formed in said closure element cutting bar, and including movement means for moving said closure element cutting bar and said cutting die plate substantially simultaneously, whereby both said closure elements and said blind components may be cut substantially simultaneously along the surface of said holding plate.

U.S. Pat. No. 6,9196,099, issued to Shade-O-Matic Limited discloses an apparatus for trimming the width of blinds of the type having a head rail, and a bottom rail, and a plurality of blind slats, each having a predetermined profile, and comprising, a support body, said body defining a head rail opening, and a bottom rail opening, and blind slat opening means, in which the recesses and opening means are aligned along a common, horizontal axis, respective said blind components being insertable into respective said openings from one side of said support body, a die plate means located on the other side of said support body, a head rail cutting recess in said die plate means, guide means on said support body for movably supporting said die plate means, said guide means defining a predetermined movement axis, whereby said die plate can move relative to said head rail opening in said support body between two positions, a first position in which said support body opening and said die plate cutting recess are in alignment with one another, and a second position in which said cutting recess is out of alignment with said opening, and, means for moving said die plate means, between said two positions, and further having a bottom rail and blind slat cutter means moveable along a horizontal axis and means for moving said cutter means to cut said bottom rail and said blind slats. The die plate movement axis is substantially diagonal to said axes of said openings and said recesses; is in order to achieve the mechanical advantage of beginning to cut at the corner of the head rail.

U.S. Pat. No. 6,366,388, also issued to Shade-O-Matic Limited, describes a blind cutdown apparatus for cutting and sawing a blind having at least a head rail component of thin material, and blind slats of thicker material suspended from the head rail, and comprising a blind holding plate having at least a head rail opening and a slat opening formed therein for receiving respective components of a blind there through, and holding them in position for cutting, a slat cutting saw moveable relative to said holding plate, for cutting blind slats extending through said holding plate, a cutting die holder adjacent to said cutting saw, said cutting die holder carrying at least one cutting die for receiving said head rail there through, and being moveable relative to said holding plate for cutting said head rail, and including movement means for moving said cutting saw and said cutting die holder substantially simultaneously, whereby both said blind slats and said head rail may be cut substantially simultaneously and in a common plane along the surface of said holding plate. The invention further provides such an apparatus and further having a saw blade guide attached to said holding plate and said saw blade being moveable there along relative to said holding plate.

In certain applications, the manual pressure that is required to operate a multi-purpose blind cutting apparatus, such as the type described in '134 in particular, can be quite significant. What is required is a multi-purpose blind cutting apparatus that addresses the aforesaid design issues and that includes a drive mechanism, as well as a relatively simple structure that nonetheless permits the cutting of window covering components. In addition, a multi-purpose blind-cutting apparatus with a driving means is desired that achieves the aforesaid objectives, and that is relatively easy to manufacture and to operate. A particular structure for a multi-purpose blinding cutting apparatus including a driving apparatus is also required that does not place undue stress on the drive mechanism and/or it requires a relatively inexpensive and low energy drive mechanism.

Ease of operation is a significant issue in that otherwise the training costs required to enable in-store operation might be prohibitive. Also, ease of operation is also important to ensure that personnel operating blind cutting apparatus can size blinds relatively quickly, thereby also minimizing customer wait times, and reducing the number of personnel required to operate the apparatus, and also the number of apparati required in each store. There is also a need for a window covering sizing system having a driving means that takes relatively little place, which is a desirable characteristic in a retail environment.

Furthermore, there is a need to provide cutting dies which are relatively easy to manufacture less costly to produce and less bulky and more light weight.

SUMMARY OF INVENTION

The present invention features a multi-operational, compact system for sizing a plurality of window coverings at a single location by operation of a window covering sizing apparatus with a driving means.

With a view to providing a window covering sizing system that addresses the various foregoing conflicting problems, the invention comprises a multi-purpose window covering sizing system for cutting a window covering having at least a head rail component, and closure elements suspended from the head rail, and comprising at least one holding plate having at least a window covering component opening and at least one cutting plate also having a corresponding window covering component opening, each of which opening for receiving respective components and elements of a window covering there through, and holding them in position for cutting, a cutting arm moveable relative to said holding plate (and defining an opening), said cutting arm being operable to cut a plurality of closure elements extending through the holding plate, the cutting plate and the cutting arm being coupled to a driving mechanism operable to pivot the cutting plate and slide the cutting arm with respect to the holding plate, thereby cutting the respective window covering components.

The holding plate and cutting plate are part of a modular structure that permits holding plates and corresponding cutting plates for cutting different sized and shaped window covering components to be mounted on the window cover sizing assembly.

The invention also relates to apparatus for cutting elements of a window covering. Such elements including at least a head rail, the apparatus comprising a holding plate having an opening for holding the head rail in a selected position, a cutting die disposed adjacent to the holding plate and having an opening for receiving the head rail extending therethrough, and a drive operable to pivot the cutting die relative to the holding plate so as to cut the head rail.

The invention also relates to an apparatus for cutting elements of a window covering with cutting means driven by a piston.

The invention also relates to apparatus for cutting elements of a window covering with cutting means driven by a piston.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

Other ways in which the features of the invention are accomplished will become apparent to those skilled in the art after the present specification is read and understood.

BRIEF DESCRIPTION OF THE DRAWINGS

FIG. 7b is a top view of the illustration of FIG. 7a;

Figure 1A:
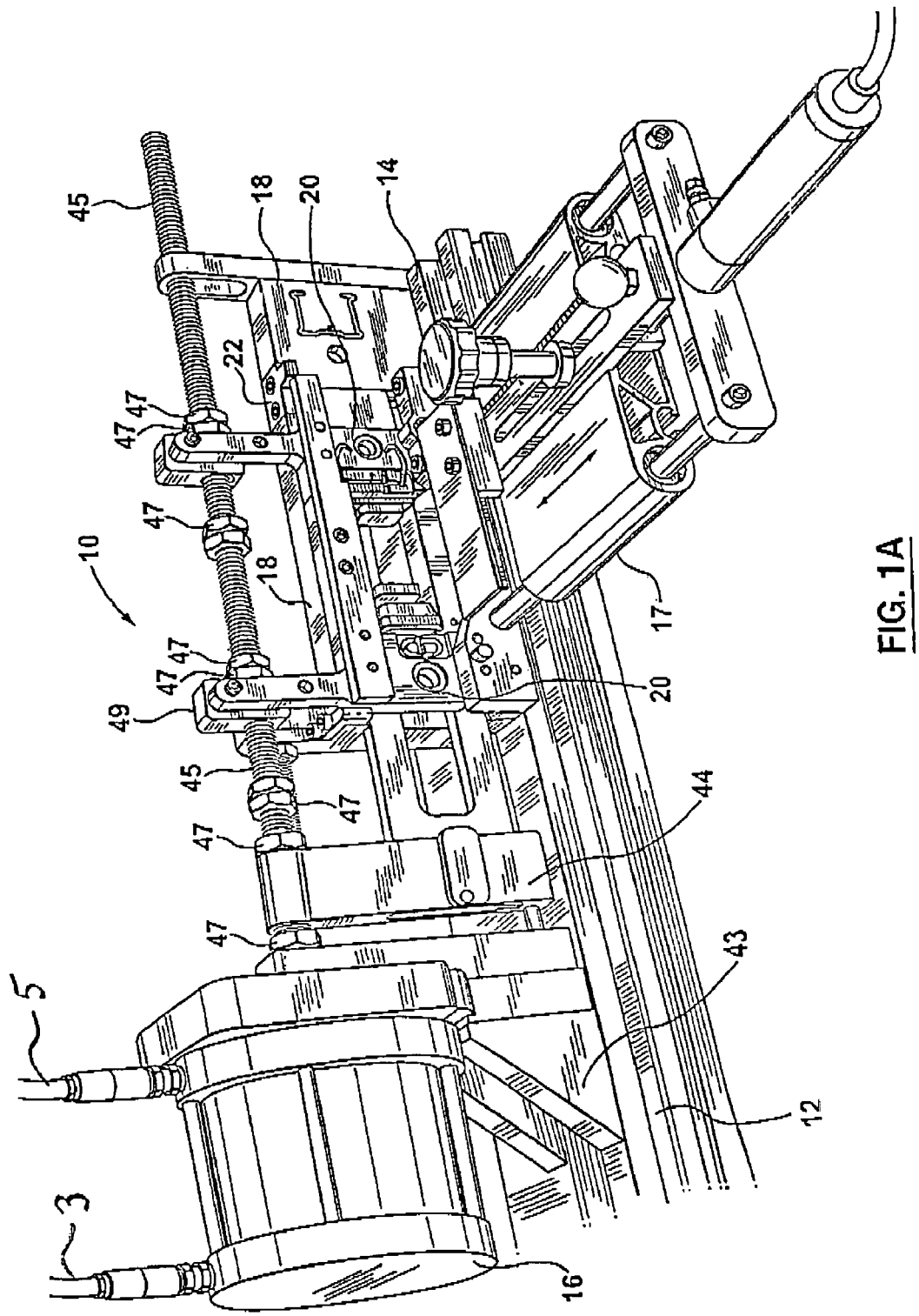
FIG. 1a is an upper perspective illustration of the window covering sizing system of the present invention.

In the drawings, preferred embodiments of the invention are illustrated by way of example. It is to be expressly understood that the description and drawings are only for the purpose of illustration and as an aid to understanding, and are not intended as a definition of the limits of the invention. In the various FIGURES, like reference numerals are used to denote like components.

DETAILED DESCRIPTION

Referring next to FIG. 1a, a multi-operation, window covering sizing system 10 is shown from one side thereof (referred to in the disclosure as the "front") in perspective to include a base plate 12, and a channel formation 14 disposed in the base plate 12, and a driving means 16, which in this particular embodiment is a pneumatic cylinder or alternatively a hydraulic cylinder). For example, the driving means 16 would include (these particular features are not shown), a cylinder including a piston within the cylinder that is activated and deactivated by air pressure directed through conduits 3 and 5. In other words air pressure introduced through conduit 3 would push the piston (not shown) to the right and move the rod 45 (connected to the piston) to the right. Upon deactivation of air pressure in conduit 3 if introduction of pressure through conduit 5 will move the piston back to the left or original rest position. Other drive means 16 are possible, such as for example an electric motor for rotating rod 45.

In one particular embodiment of the present invention, the window covering sizing system 10 also includes a measuring apparatus 17 connected to the base plate 12 and extending from said base plate 12. The operation of the measuring apparatus 17 is further described below.

The window covering sizing system is generally designed for sizing window coverings, e.g. consisting of a head rail and a fabric portion (such as a pleated blind), a Venetian blind consisting of a head rail, a plurality of closure elements or slats or blinds and a bottom rail; or a vertical blind consisting of a head rail and vertical slats (as explained below). Thus the apparatus is adaptable to a wide variety of different types of blinds and closure elements and materials.

The purpose of the window covering sizing system is that it can be installed in a retail store or blind outlet. The store will stock blinds in various standard widths, or in the case of vertical blinds, lengths. Customers will then come in having measured the blind opening and will specify the dimensions of the blind to be purchased. The personnel in the retail store will then select the appropriate blind and trim it to the appropriate dimensions and supply it to the customer while he waits or at least, only with a brief delay.

The entire process therefore of satisfying a customer's needs is speeded up as compared with the former practice in which sales persons would make a call on the premises of the customer, take measurements and then order blinds of specific dimensions from a factory. The window covering sizing system might also be operated by a customer himself or herself.

One aspect of the window covering sizing system 10 of the present invention is that it presents a modular structure. As best shown in FIG. 1a, one feature of this modular structure is that the channel formation 14 is operable to receive a plurality of holding plates 18, each holding plate 18 generally including an opening corresponding in profile to a cross section portion of a window covering requiring sizing, as particularized below. The holding plates 18 are operable to hold the portions of the window coverings to which the profile of their opening corresponds. As shown in FIG. 1a, the window covering sizing system 10 also includes a plurality of cutting plates 20, wherein each cutting plate 20 also includes an opening that corresponds in profile to the opening of the particular holding plates 18, such that when each cutting plate 20 is mounted to the base plate 12 (by operation of the modular mounting structure described below), the pivotal cutting functions described below are permitted. One aspect of the modular mounting structure is that holding plates 18 and corresponding cutting plates 20 can be added or removed, or their order changed, as required by the window covering sizing task undertaken. This provides flexibility so that, in operation, stores can alter the configuration of the window covering system 10, for example, to respond to changes in window sizing requirements due to introduction of window coverings having different profiles or to respond to an increase in popularity of certain window coverings.

The holding plates 18 are generally secured in position by means of any suitable fastenings or threaded devices, for example the bolts 22 shown in FIG. 1a.

Figure 1B:
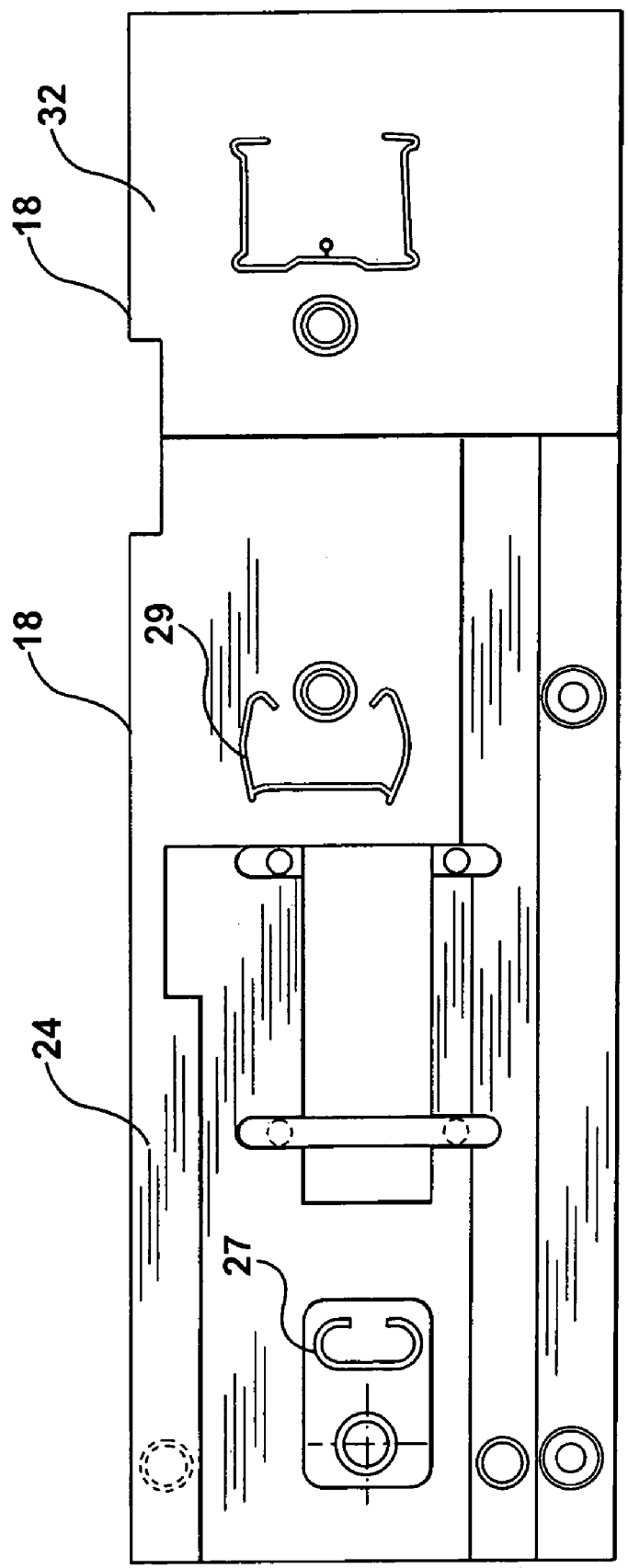
FIG. 1b is a partial view of the window covering sizing system illustrating the holding plates of the present invention.

In the particular arrangement illustrated of the present invention shown in FIG. 1b, a first holding plate 24 and a corresponding first cutting plate 26 are arranged proximal to the driving means 16. Each of the first holding plate and the first cutting plate 26 includes an opening corresponding to the cross section of the bottom rail (bottom rail opening 27) of a conventional Venetian blind, or a blind having closure elements formed of folded or pleated fabric, as well as an opening corresponding to the top rail (top rail opening 29) of a conventional Venetian blind, or a blind having closure elements formed of folded or pleated fabric.

It should be understood that the first holding plate 24 could also consist of two separate holding plates, one providing the bottom rail opening 27 and the other providing the top rail opening 29, both of which being attached to the modular structure described.

Figure 9:
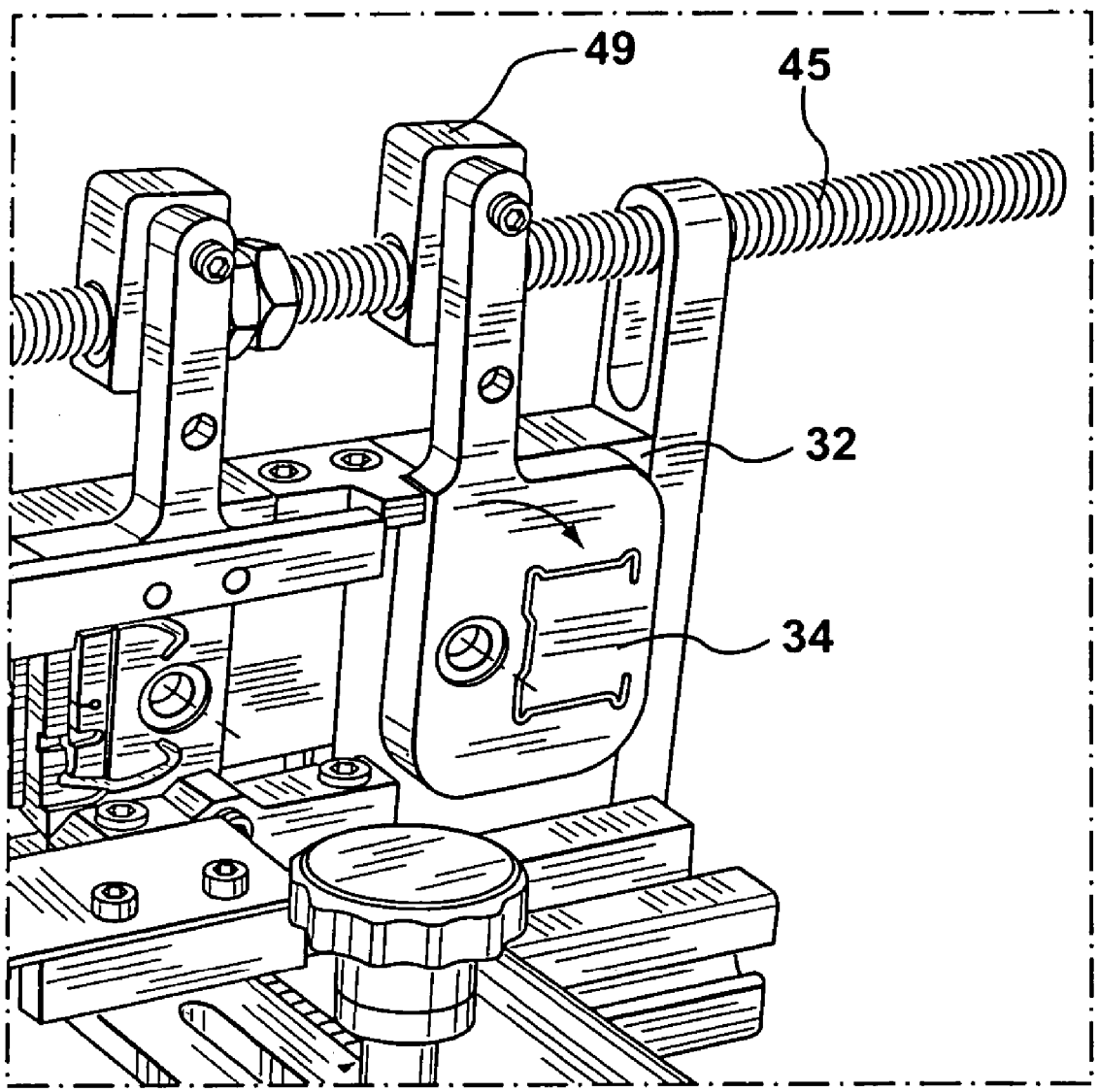
FIG. 9 is a partial perspective view of the window covering sizing system of the present invention, illustrating a further holding plate.

A further holding plate 32 is shown mounted further from the driving means 16 than the first holding plate 24, for receiving a further type of blind in the example shown the further type blind would have a different configuration and cross section and size of the head rail. The window covering sizing system 10 is operable to permit a third cutting plate 34 to be mounted adjacent to the further holding plate 32, as shown in FIG. 9.

In addition to the various head rail openings illustrated, other head rail openings may be provided if desired for other types of blinds, the three types of head rail openings illustrated, being merely shown by way of example and without limitation. Further holding plates 18 and cutting plates 20 corresponding to such other head rail opening can be provided and mounted on to the base plate 12.

Figure 2:
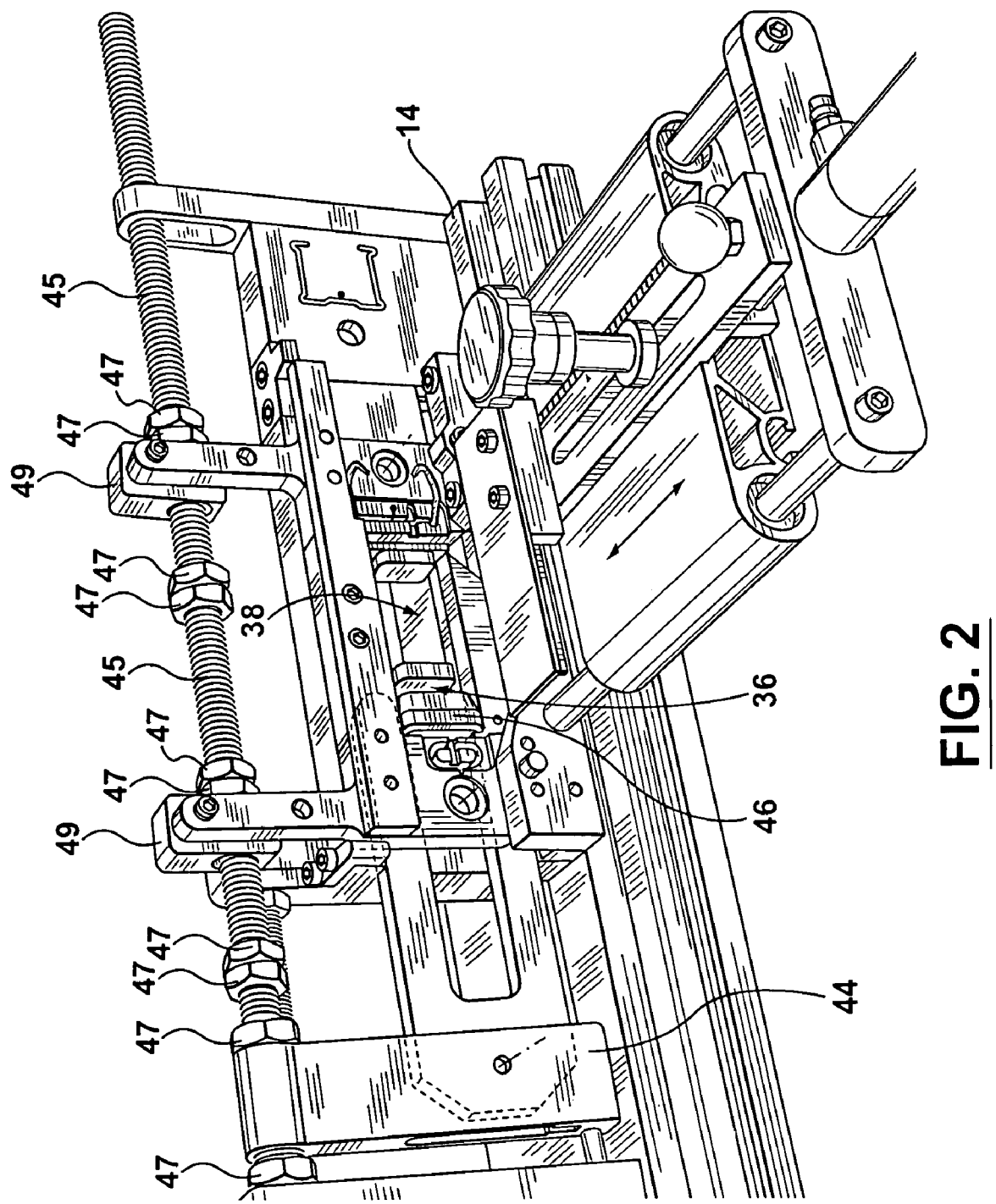
FIG. 2 is a further upper perspective illustration of the window covering sizing system of the present invention.

Closure element openings are provided, for receiving a plurality of closure elements for example blinds from a Venetian blind or for receiving the multiple folds of closure elements from a typical fabric or pleated blind. In particular, as shown in FIG. 2, a first (larger) closure element opening 36 and a second (smaller) closure element opening 38 is provided adjacent to the first closure element opening 36, for the reasons stated below.

Figure 8A:
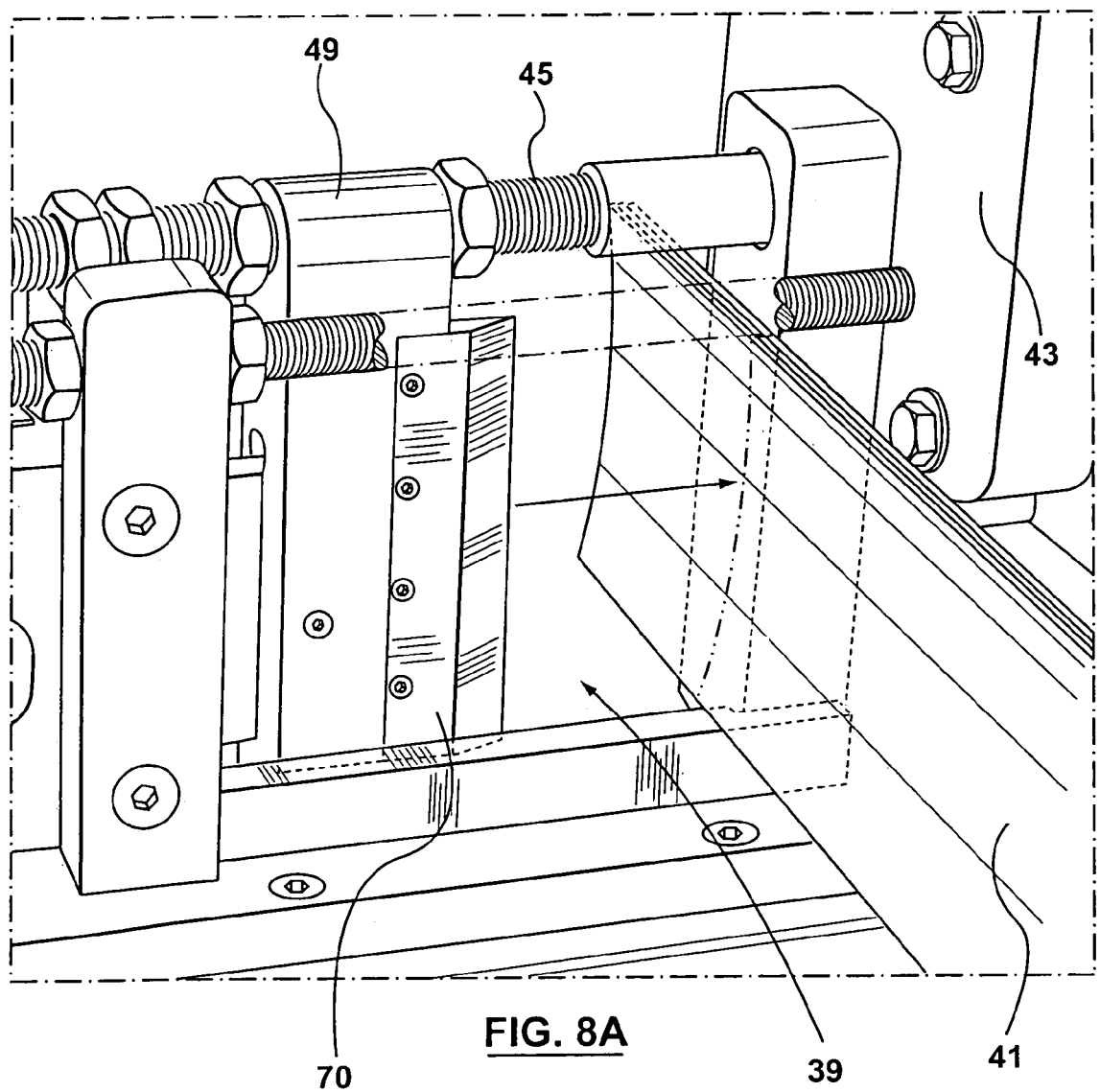
FIG. 8a is a view of the vertical blind slat cutting portion of the window covering sizing system in a first, pre-cutting position thereof.

As best illustrated in FIG. 8A, a third opening 39 disposed closer to the driving means is provided for vertical slats 41 of vertical blinds, as explained below. Usually such blinds have slats which are of greater width than the width of, for example, the Venetian blind slats and thus a separate opening is required for such blind slats.

It will thus be seen that in the illustrated embodiment a provision is made for a wide variety of different head rails and a wide variety of different closure elements.

In a typical Venetian blind the head rail, slats and bottom rail are all preassembled on ladder tapes (not shown), such as are well known in the art, in the factory before they are shipped out. The slats are thus located a predetermined distance apart from one another and although they can be closed up and sandwiched together they cannot be spread apart more than the distance allowed by the ladder tapes.

In order to facilitate the cutting of the head rail of such a Venetian blind which is usually made of sheet metal and the bottom rail, which is also usually made of sheet metal although it may be made of extruded plastic, which are located at the top and bottom of the blind, and the simultaneous cutting of the blind slats, which are located between the head rail and the bottom rail, it has been found to be particularly convenient, in accordance with the invention, to provide for the bottom rail opening 27 and the top rail opening 29 to be spaced apart a substantial distance. As will be understood however, due to the restrictions imposed by the ladder tapes, at least the first blind slat below the head rail, can be only displaced away from the head rail opening, by a distance equal to the spacing defined by the ladder tapes. Similarly, at the bottom end of the blind, the spacing between the bottom blind slat and the bottom rail is restricted by the length of the ladder tapes.

Figure 3:
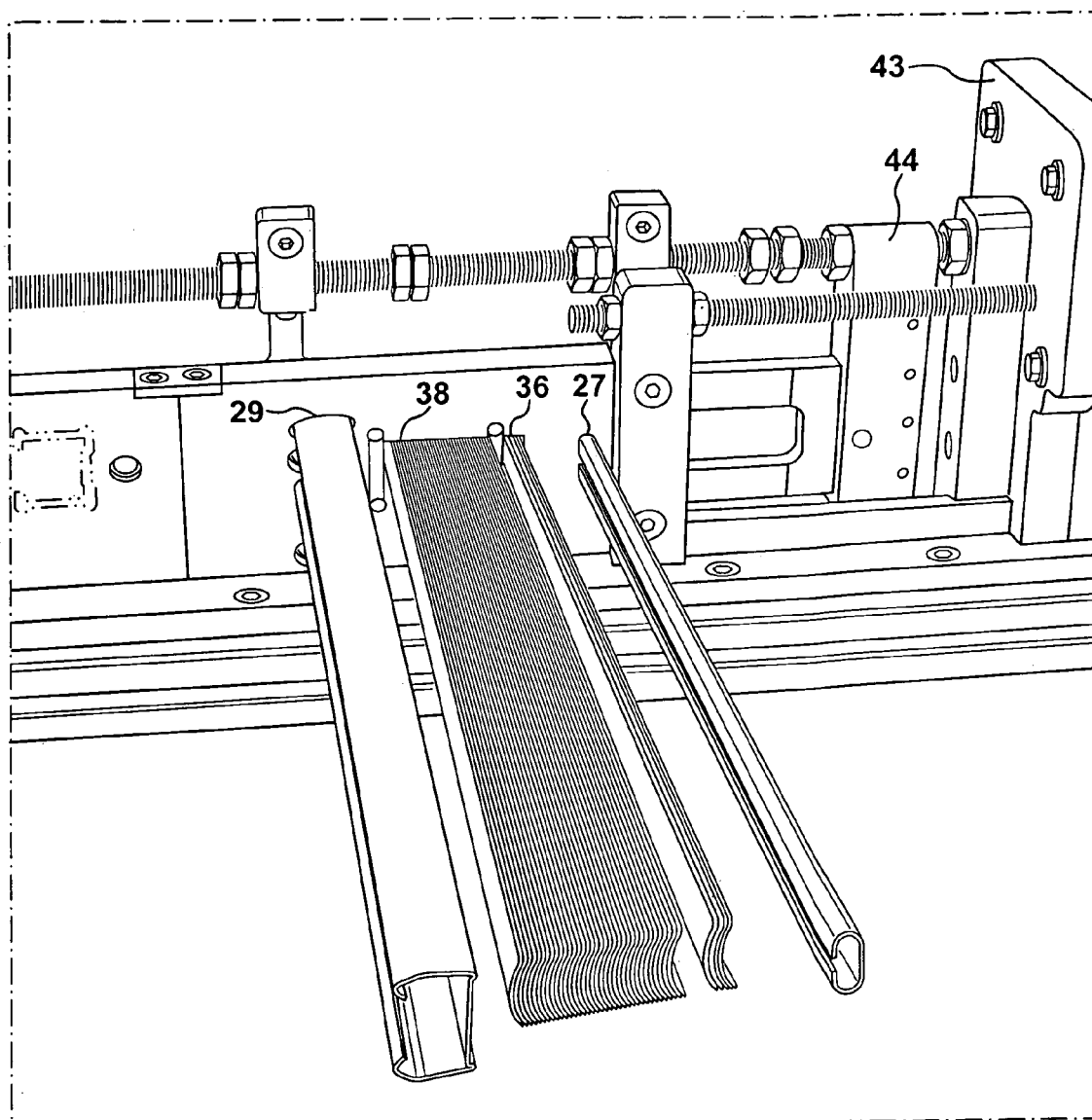
FIG. 3 is another upper perspective illustration of the same system as shown in FIG. 2, shown from the opposite side.

In order to accommodate these restrictions, and to facilitate this, the narrow first blind closure element opening 36 is provided and spaced along side it the wider second closure element opening 38 is provided. This enables the insertion of the various blind closure elements and the head rail and bottom rail, in a convenient manner, without straining the ladder tapes, and without producing distortion or damage to the blinds themselves. This aspect of the invention is also illustrated in FIG. 3. FIG. 3 illustrates the opposite side of the window covering sizing system 10 and in particular shows how the window covering components are inserted through the various opening described. All of these openings are obviously sized such that the corresponding window covering elements can be relatively easily inserted therethrough. In the mounting portion, the openings of the holding plate are aligned with the opening of the cutting plate.

Figure 4:
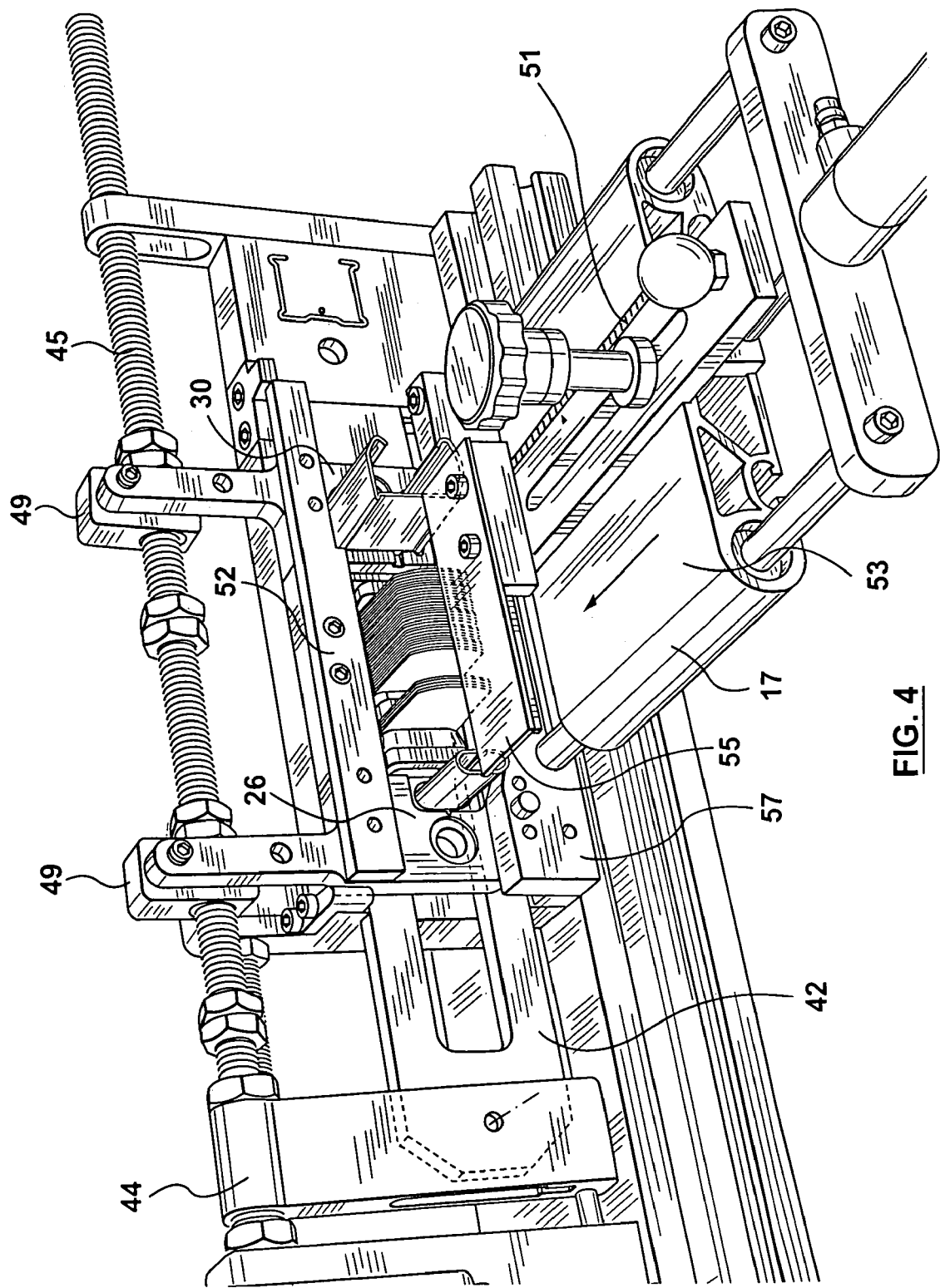
FIG. 4 is a perspective illustration of the window covering sizing system of the present invention, illustrating the cutting mechanism in a first, pre-cutting position.
Figure 7A:
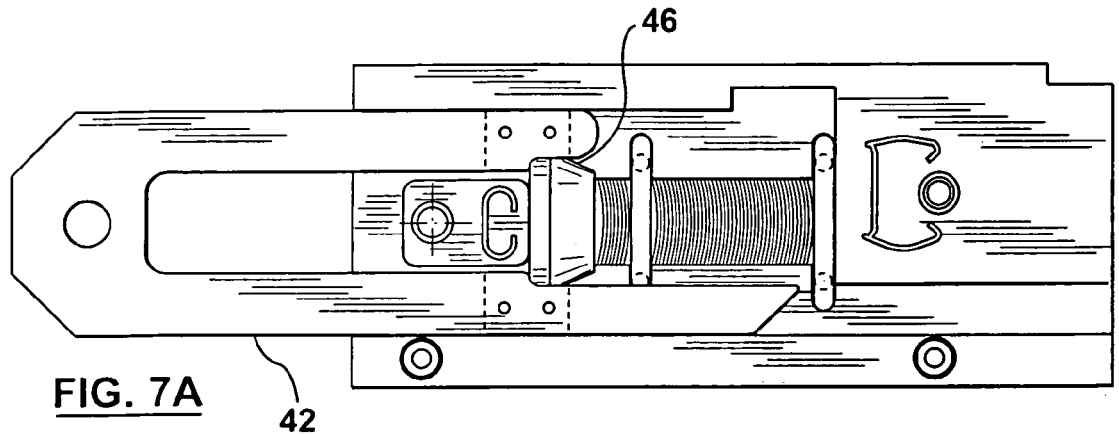
FIG. 7a is a broken away illustration of the operation of the cutting arm, wherein the cutting arm is in the first, pre-cutting position.
Figure 7B:
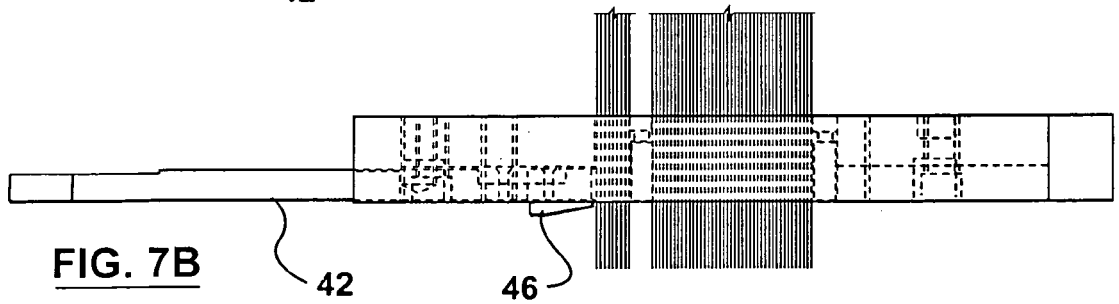
Figure 7C:
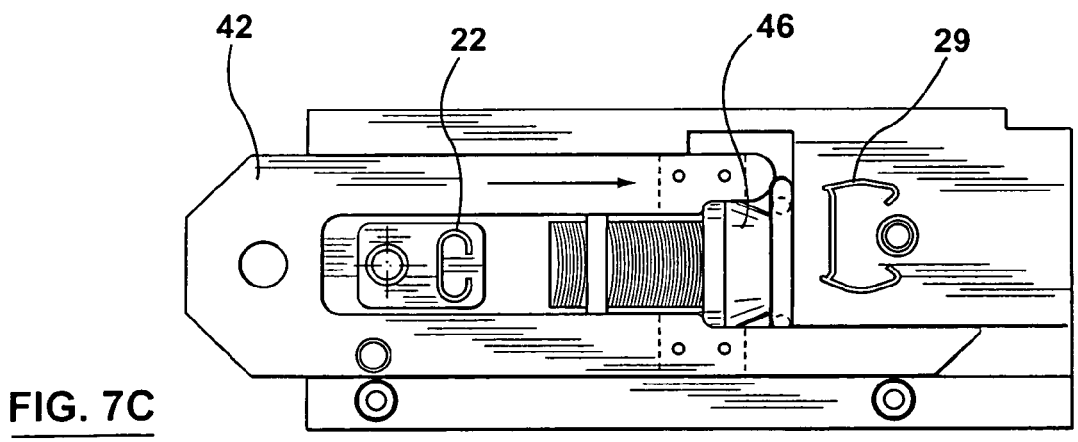
FIG. 7c is a broken away illustration of the operation of the cutting arm, wherein the cutting arm is in the second, post-cutting position.
Figure 7D:
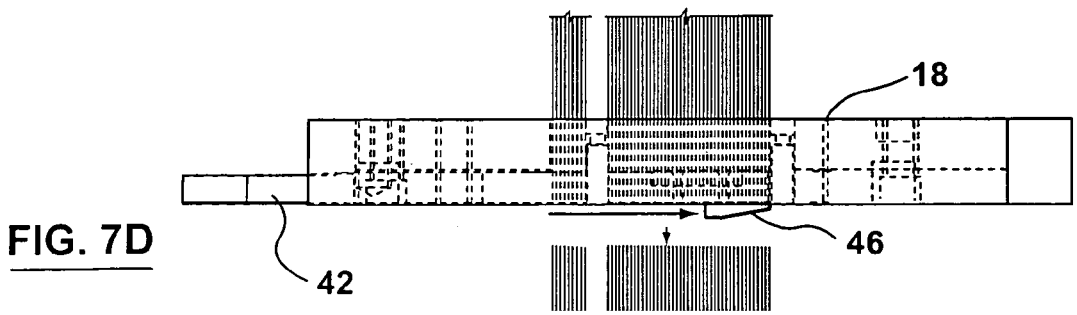
FIG. 7d is a top view of the illustration of FIG. 7c.
Figure 7E:
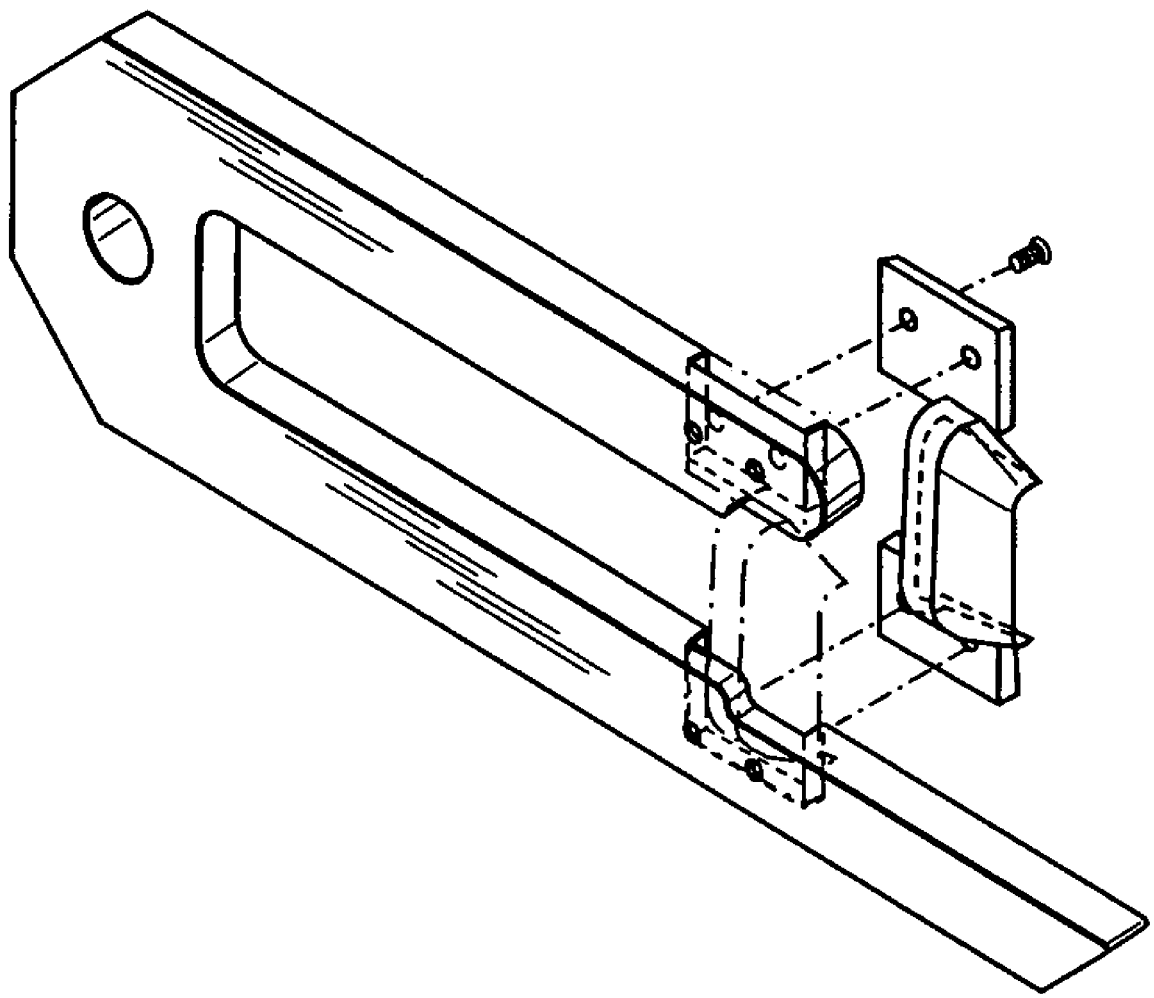
FIG. 7e illustrates the blade

Reference will now be made to FIG. 4. In this drawing, the operation of closure element cutting arm 42 is illustrated. The cutting arm 42 is illustrated in isolation in FIG. 7c.

As illustrated in FIG. 1a, the driving means 16 is attached to a vertical support 43. A rod 45 (preferably threaded) is inserted through an opening (not shown) in the vertical support 43. The driving means 16 is connected to the rod 45, and the driving means 16 is operable to displace or move the rod 45. A plurality of stroke selecting means or, in one particular embodiment, nuts 47 and lugs 49 are disposed along the length of the rod 45. Each of the lugs 49 includes a hole through which the rod 45 is inserted. This hole is generally of an oblong shape to support the arc of the swing of the cutting plates 20 described below. The operation of the nuts 47 and lugs 49 is further explained below. As particularized below, the nuts 47 and reciprocal lugs 49, arranged along the length of the rod 45 are operable to determine the stroke of the rod 45 and thereby the actuation of the sizing components (cutting arm 42 and cutting plate(s) 20) described below.

In these drawings, the cutting arm 42 is mounted on support arm 44. The connection of the cutting arm 42 to the support arm 44 is generally adjustable, thereby permitting the adjustment of the distance of travel of the cutting arm 42, in order to accommodate different cumulative thicknesses of cover elements to be cut, as particularized below. The cutting arm 42 is located along side the inwardly facing surface of the holding plate(s) 24 and is slidable along that surface which defines a cutting arm for procuring trim cuts of the various blind elements along the common plane. The cutting arm 42 includes a blade 46, and the cutting arm 42 defines a U-shaped opening for reasons described below. The operation of the cutting arm is best understood by reference to FIGS. 7a, 7b, 7c and 7d, also based on the description of the cutting action described below.

The blade 46 is releasably mounted on the cutting arm 42, so that they may periodically be resharpened or remade and then reinserted.

Figure 2A:
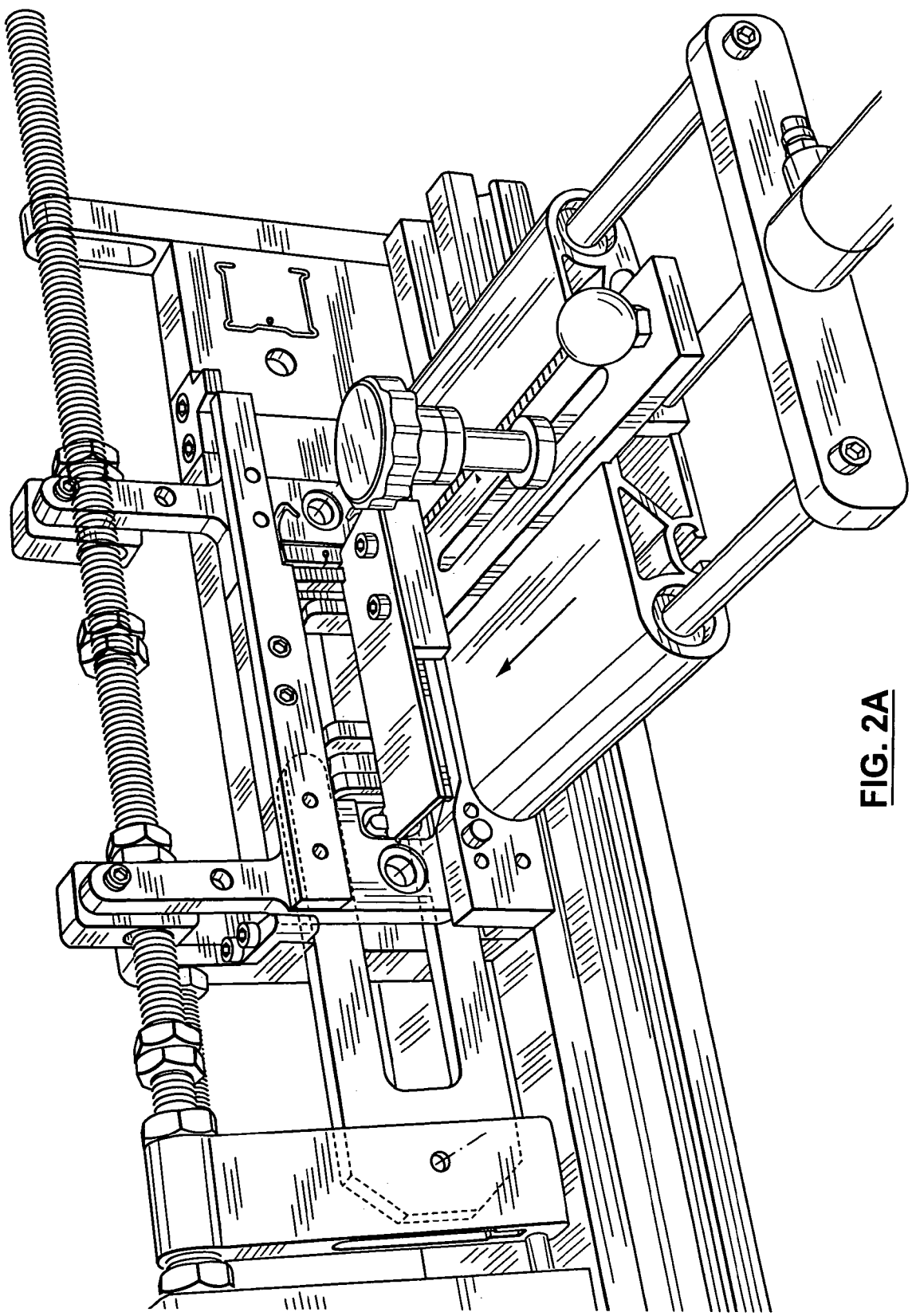
FIG. 2a is a further upper perspective illustration of the window covering sizing system of the present invention illustrating that the moveable sizing apparatus is operable to abut against a recessed surface disposed on the cutting plates.
Figure 6A:
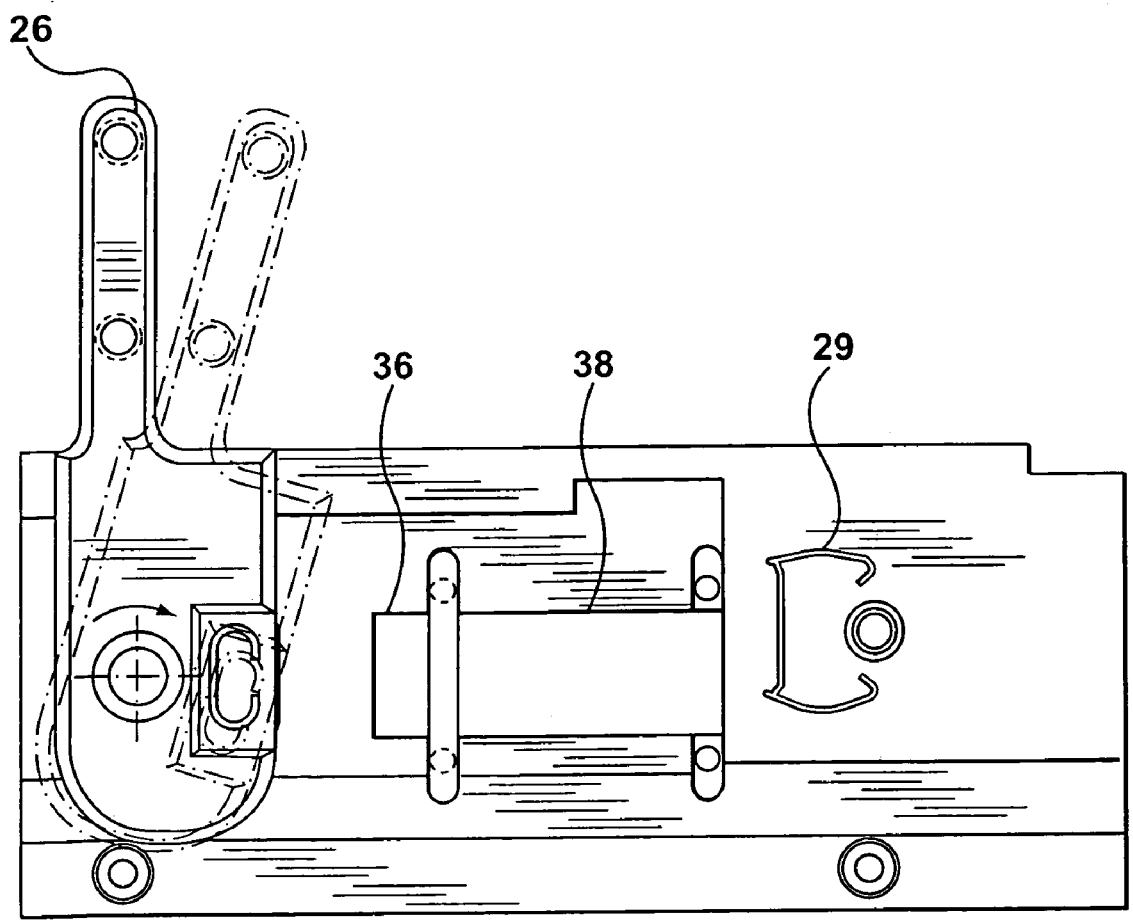
FIG. 6a is a broken away illustration of the holding plate/cutting plate aspect of the invention, illustrating the pivoting action of the cutting plate.

As shown in FIG. 3, the top rail, slats and bottom rail are each placed through the various openings. As shown in FIG. 4, a measuring apparatus 17 is used to measure the length to be cut form the various components of the window coverings. The measuring apparatus includes a ruler 51 and a sizing support frame 53 and a moveable sizing plate 55 connected to the sizing support frame. The sizing support frame 53 is moveable in relation to the ruler 51 to enable the cutting of the window covering to be sized, by the moveable sizing plate 55 abutting against the window covering components, as shown in FIG. 4. As illustrated in FIG. 6a, each cutting plate 20 (in one particular embodiment of the present invention) includes a recessed surface 56 disposed adjacent to the opening. As best shown in FIG. 2a, the moveable sizing plate 55 is sized to fit the recess that defines the recessed surface 56. This feature of the invention permits the sizing of window covering components that are smaller than the width of the cutting plates 20. Accordingly, for clarity, it is not necessary that the window components protrude from the opening in order to achieve sizing of such components by operation of the cutting plate(s) 20.

Figure 5:
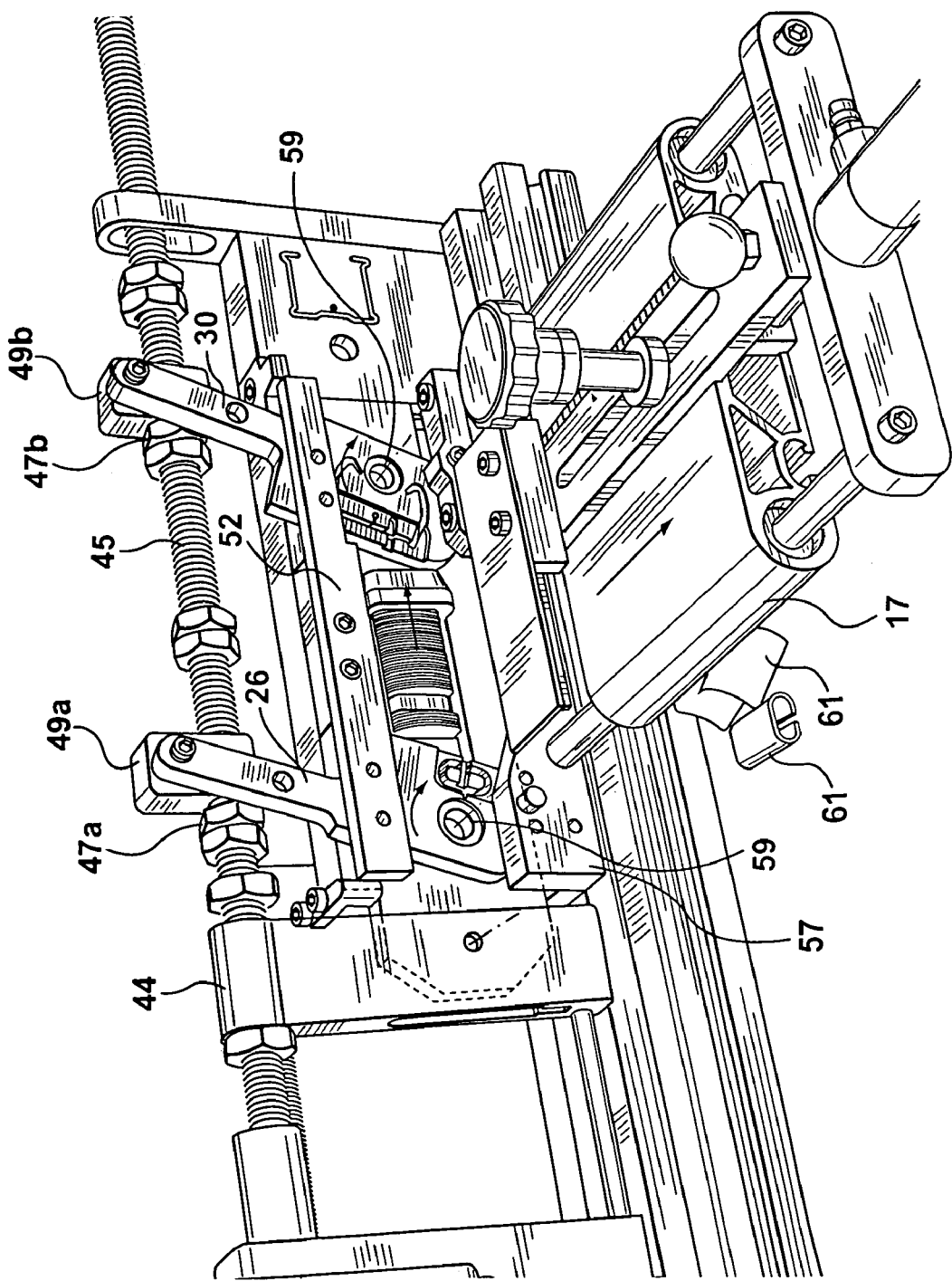
FIG. 5 is a further perspective illustration of the window covering sizing system, also as shown in FIG. 4, wherein the cutting mechanism is in a second, post-cutting position.
Figure 6B:
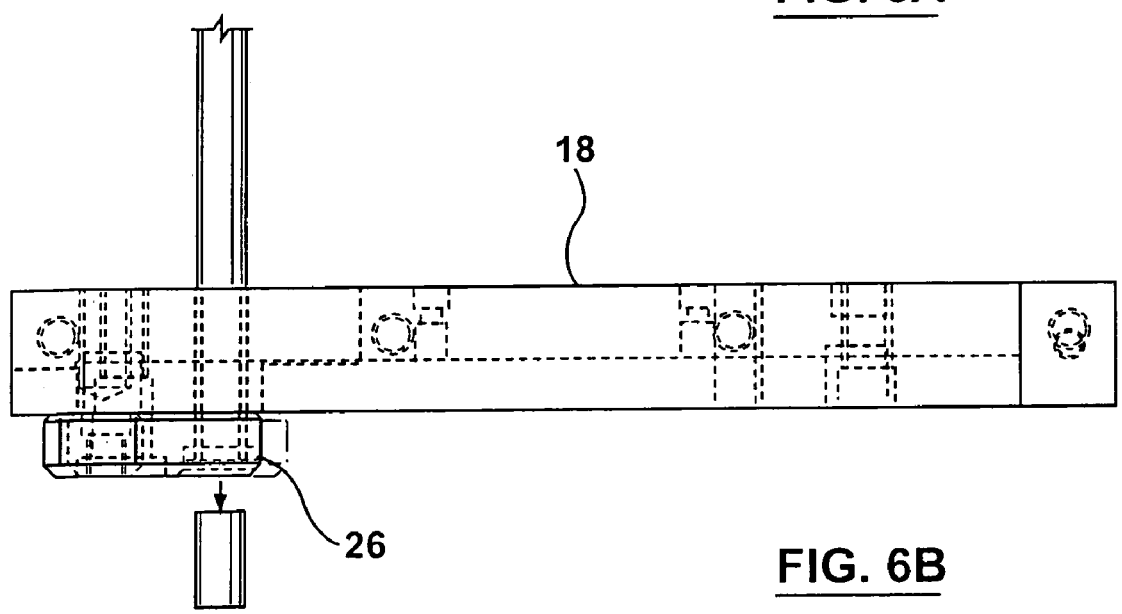
FIG. 6b is a top view of the portion of the window covering sizing system illustrated in FIG. 6a, illustrating in particular the openings of the holding plate and the cutting plate that are moveable with respect one another to achieve a cutting action for cutting a blind component.
Figure 6C:
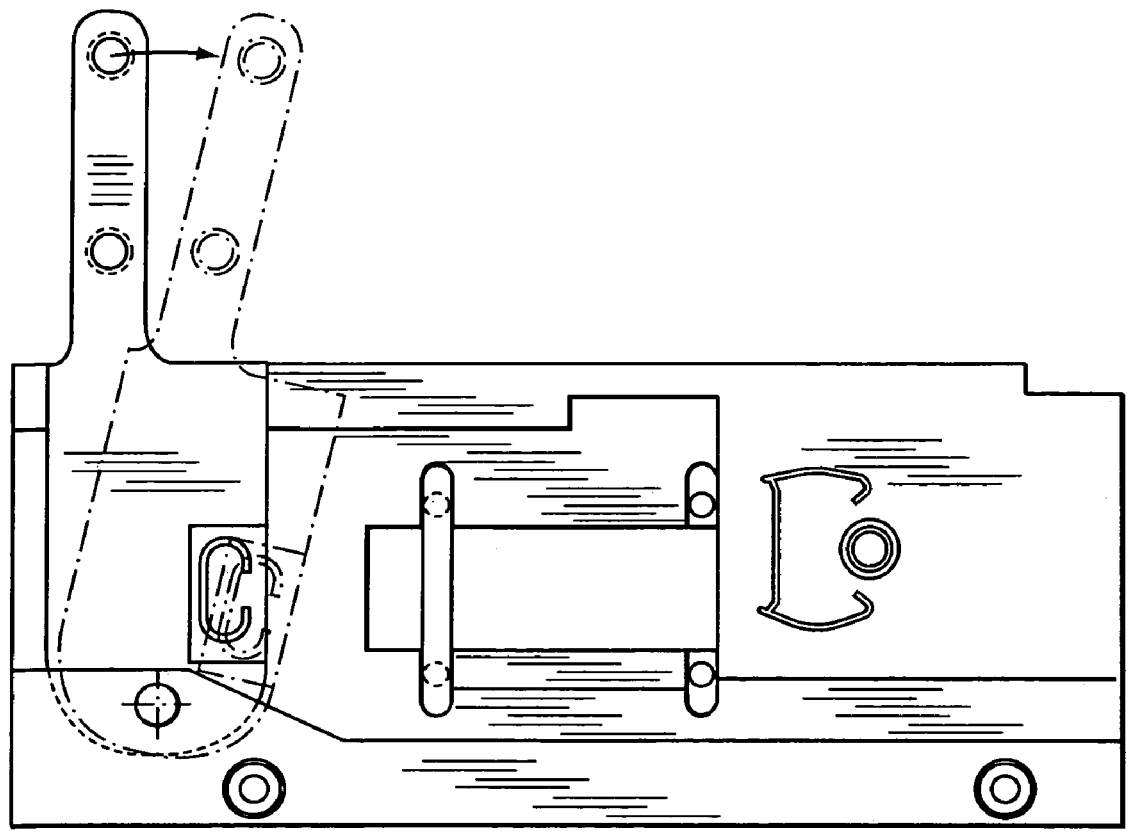
FIGS. 6c and 6d are similar to FIGS. 6a and 6b except that they show the pivot point being lower to increase the leverage action.
Figure 6D:
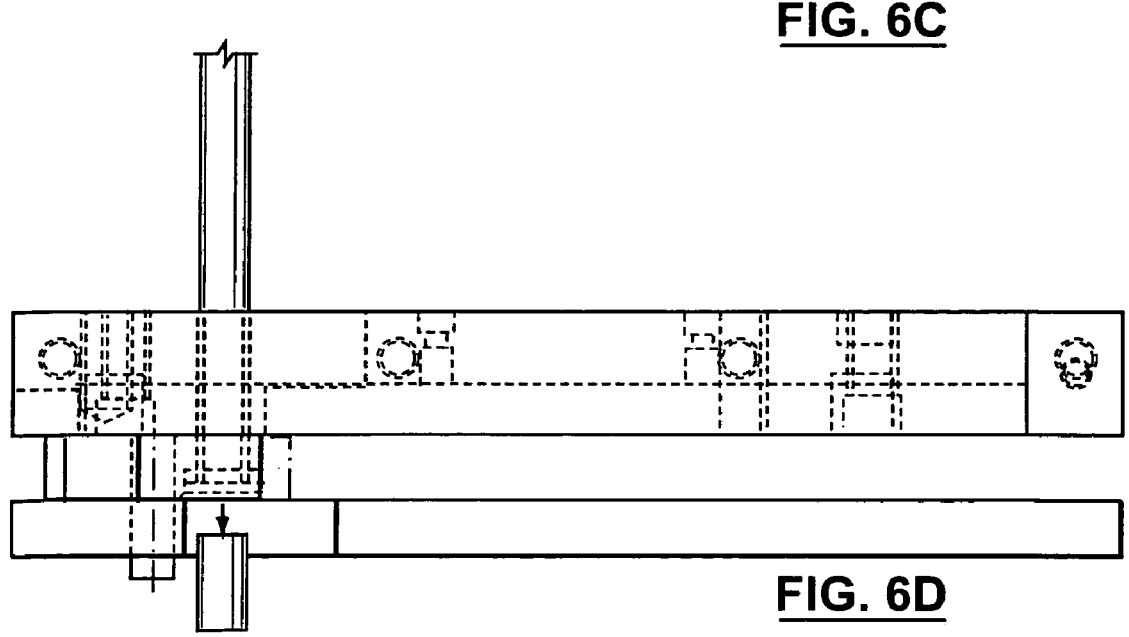

As best shown in FIG. 5, the first and second cutting plates 26, 30 are rotatably mounted to a lug 49 at one end thereof, and also mounted to a pair of mounting plates 57. The first and second cutting plates 26, 30 are mounted to pivot around pivot points 59. This pivoting action is further illustrated in FIG. 6*a*. Also the communicating openings that co-operate with the pivoting action to provide the cutting action of the cutting plate 26 is best understood by reference to FIG. 6*b*, which illustrates the cutting of a bottom rail component by operation of such cutting action.

As best shown in FIG. 5, when the driving means 16 is engaged, the rod 45 is displaced to the right, and by arrangement of the various components described above the window covering system 10 in sequence operates as follows: (1) the cutting arm 42 begins cutting the closure elements in the direction of the arrow shown adjacent to the closure elements; (2) the nut 47*a* engages lug 49*a*, which in turn engages the first cutting plate 26 to pivot around the pivot point 59, thereby snipping the bottom rail; and (3) the nut 47*b* engages lug 49*b*, which in turn engages the second cutting plate 30 to pivot around the pivot point 59, thereby snipping the top rail. As shown in FIG. 5, the cut portions 61 of the window coverings drop between the base plate 12 and the measuring apparatus 17. Specifically, the rod 45 has a stroke that is defined by the piston. The reciprocal movement of the lugs 49*a* and 49*b*, on the one hand, and the respective first cutting plate 26 and the second cutting plate 30 depends on the placement of nuts 47*a* and 47*b*. It should be understood that the arrangement of nuts 47 and lugs 49 along the rod 45 are one particular means of stroke selection. The nuts 47 can be arranged to select the cutting pressure, for example, to account for different thicknesses of window covering components to be cut, etc. For example, if nut 47*a* is arrange in closer proximity to the first cutting plate 26 in the pre-cutting position, then the movement of the rod 45 between the pre-cutting position and the post-cutting position will cause the first cutting plate 26 to achieve a larger arc and therefore provide more force to cut. The arrangements of nut 47*b* can be modified accordingly. Further nuts 47 arranged in relation to further cutting plates arranged along the rod 45 (as described above) can be used to regulate the movement of the various cutting plates 20. As shown in FIG. 5, the nuts 47 are generally organized in pairs so that they can be tightened against one another to keep them in a fixed position along the rod 45.

It should be understood that the arrangement disclosed in this invention of the holding plates 18 and pivoting cutting plates 20 provides an effective structure that is easy to mount and dismount as is required to vary the particular holding plate/cutting plate combinations that is relatively inexpensive to produce.

The present invention permits the head rails, bottom rails and closure elements to be cut in a common plane, in a relatively rapid sequence, or at least with all of the window covering components. This produces the most advantageous result in practice, and enables the ends of blinds, typically Venetian blinds, but also in other forms of window coverings, to be trimmed down each side edge, so as to produce the desired amount of end trim on all components equally.

The various components can be cut sequentially or simultaneously or selected. The pivotal cutting produced by the cutting plates 26, 30 has advantages in cutting metallic components that pass through the openings provided therefor.

Figure 8B:
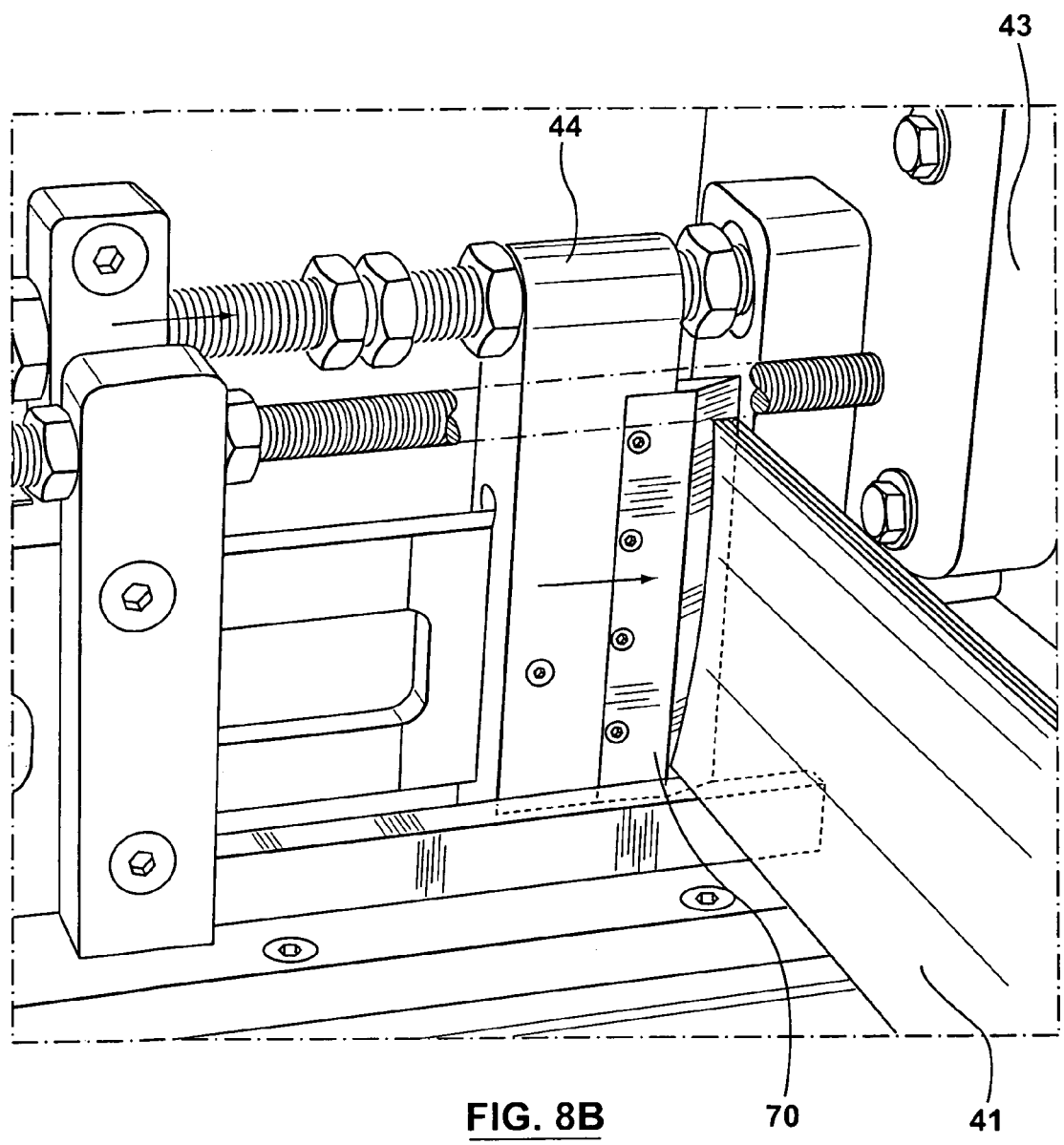
FIG. 8b is a view of the vertical blind slat cutting portion of the window covering sizing system, in a second post-cutting position thereof.

FIGS. 8*a* and 8*b* illustrate another feature of the invention. Specifically, a vertical blind blade is mounted on the support arm 44, whereby the rod 45 when returning toward the driving means 16 is operable to cut a stack of vertical blind slats placed between the vertical support 43 and support arm 44, by operation of vertical slat blade 70.

It should be understood that the design of Venetian blinds requires at least two cords and in some cases more raise cords and tilt cords. These cords are generally arranged at equal distances from each side of the blind. Consequently, sizing the blind to width required trimming each side, by an amount equal to one half of the desired total trim amount, so as to ensure the blind had a satisfactory symmetrical appearance.

Also if the cutting plate becomes worn they can be easily removed and replaced at a relatively low cost.

The foregoing is a description of a preferred embodiment of the invention which is given here by way of example only. The invention is not to be taken as limited to any of the specific features as described, but comprehends all such variations thereof as come within the scope of the appended claims.

The invention claimed is:

1. A multi-purpose window covering sizing apparatus for cutting a window covering that includes a plurality of window covering components including a head rail and optionally a bottom rail and closure elements suspended from the head rail, the sizing apparatus comprising:
    (a) at least one holding plate defining at least one window covering component opening and at least one closure element opening for receiving the respective window covering components and the closure elements therethrough and holding them in position for sizing;
    (b) at least one cutting die being disposed adjacent to at least one corresponding window covering component opening, each of the at least one cutting die defining a die opening corresponding to the corresponding window covering component opening, said die opening receiving therethrough the corresponding window covering component, wherein the at least one cutting die is mounted to the apparatus for pivotal movement with respect to the at least one holding plate; and
    (c) a cutting arm moveable relative to said holding plate, said cutting arm being operable to cut the closure elements extending through the at least one closure element opening;
    wherein the at least one cutting die and the cutting arm are coupled to a driving means operable to reciprocally engage the at least one cutting die to pivot, and the cutting arm to slide with respect to the holding plate, thereby sizing the respective window covering components and closure elements;
    wherein the apparatus comprises a base that is operable to receive in fixed engagement thereto the at least one holding plate and the at least one cutting die from a plurality of different holding plates and cutting dies corresponding to a plurality of different window covering components and covering element sizes and profiles, thereby defining a modular structure for accommodating a plurality of different holding plates and cutting die arrangements for sizing different window coverings having window covering components and covering elements of different sizes and profiles;
    selective actuating means coupled to the driving means, wherein the selective actuating means is operable to permit the reciprocal engagement of the at least one cutting die and of the cutting arm to be selectively determined; and wherein the driving means includes an elongate member to travel a defined distance in a direction of the sizing of the window covering, and wherein the elongate member is coupled with one or more actuating elements disposed along the length thereof, and wherein the at least one cutting die and the cutting arm are also coupled to the elongate member such that the actuating elements are operable to selectively and reciprocally engage each of the one or more cutting dies and the cutting arm based on the position of such actuating elements along the length of the elongate member.

2. The sizing apparatus claimed in claim 1, wherein the actuating elements include a lug mounted on the elongate member for engagement of the at least one cutting die to pivot with respect to the pivot point thereof, and one or more nuts coupled to the elongate member such that movement of the elongate member in the direction of the sizing of the window covering actuates the lug to engage the at least one cutting die.

3. The sizing apparatus claimed in claim 2, wherein the actuating elements also include a support arm coupled to the cutting arm, which support arm is also coupled to the elongate member, and wherein a further one or more nuts coupled to the elongate member at a particular location along the length thereof determines the movement of the cutting arm when the elongate member moves in the direction of the sizing of the window covering.

4. The sizing apparatus claimed in claim 2, wherein the apparatus also comprises a measuring apparatus mounted to the base on the side thereof adjacent to the one at least cutting die, which measuring apparatus is operable to permit the portion of the window covering to be cut off during sizing to be measured.

5. The sizing apparatus claimed in claim 4, wherein the measuring apparatus includes a moveable sizing plate, wherein the moveable sizing plate is moveable in the direction of the holding plate so that the moveable sizing plate in a common plane abuts against the respective portions of the window covering that are to be sized.

6. The sizing apparatus claimed in claim 5, wherein the one or more cutting dies define a recessed portion adjacent to the opening thereof, wherein the moveable sizing plate is disposed to register within such recessed portion, thereby permitting respective portions of the window covering to be sized in a common plane having a respective length that is substantially equal to the distance between an inward surface of at least one cutting die and the surface of the recessed portion.

* * * * *